Patented Feb. 1, 1938

2,107,005

UNITED STATES PATENT OFFICE

2,107,005

CELLULOSE ETHER RECOVERY

Walter J. Le Fevre and Joseph W. Britton, Midland, Mich., assignors to The Dow Chemical Company, Midland, Mich., a corporation of Michigan No Drawing. Application February 5, 1937,
Serial No. 124,282

7 Claims. (Cl. 260—152)

This invention relates to a method for the recovery, purification, and precipitation of cellulose ethers from the product obtained by the etherification of alkali cellulose.

The etherification of alkali cellulose with agents such as the lower alkyl halides results in the formation of a mixed product containing cellulose ethers, some unchanged alkyl halide, the alcohol and ether corresponding to the alkylating agent employed, and the alkali halide. It is an object of this invention to provide a process whereby cellulose ethers may be recovered from such reaction mixtures in a substantially purified condition, and precipitated in a finely divided form so that subsequent solution of the recovered cellulose ether in the customary organic solvents therefor may be accomplished in a facile manner. It is a further object of the invention to provide a process for the removal of the cellulose ether reaction product from the reaction vessel with such a degree of completeness that said vessel is left substantially clean and may be subsequently reloaded for further etherification reactions without necessity for further cleaning.

The description of the present invention will be made with reference to ethyl cellulose prepared by the interaction of alkali cellulose and ethyl chloride, but it is to be understood that this is but one exemplification of the invention and that other alkylating agents may be employed, and that other cellulose ethers may be as effectively recovered according to the present invention as the one herein described.

In preparing ethyl cellulose it is customary to employ a large excess of ethyl chloride over the amount theoretically required for the etherification. In the present invention, advantage is taken of the excess of ethyl chloride by utilizing the vapor pressure thereof at reaction temperature to effect discharge of the ethylator contents, said discharge being made below the surface of cold water in a substantially closed system. The excess ethyl chloride present in the reactor, together with any diethyl ether and ethyl alcohol formed as by-products in the ethylation, is an excellent solvent for ethyl cellulose. By releasing the pressure on the reaction vessel while still at approximately the reaction temperature, the ethylation mixture is removed therefrom substantially completely, and the reactor, freed from reagents and products, is in condition for re-use without further cleaning. By effecting the discharge in a closed system, no appreciable loss of ethyl chloride, ethyl ether, or of ethyl alcohol occurs. The content of the ethylator, on being discharged under water, immediately disperses therethrough with formation of a finely divided precipitate of ethyl cellulose. The excess ethyl chloride, together with any alcohol and ether present, are recoverable from the aqueous medium by simple elevation of the temperature thereof in a closed system connected with suitable condensing means. Sodium chloride is extracted substantially completely from the ethyl cellulose when the latter material is dispersed through the water. Subsequent filtration and washing with additional quantities of water results in the deposition on the filter bed of a substantially pure, finely divided ethyl cellulose. When this product is dried it is capable of easy and rapid solution in all of the common solvents for cellulose ethers with resulting formation of clear solutions.

When ethylating alkali cellulose with ethyl chloride, we have ordinarily operated at temperatures from 100 to 125° C. or higher, and at corresponding pressures of about 200 to about 250 pounds gage. Such temperatures are sufficient to cause complete solution of the ethyl cellulose in the mixture of excess ethyl chloride and the ethyl ether and alcohol which may have been formed as by-products of the reaction. The pressures employed are more than adequate to effect a complete discharge of the contents of the reactor when the latter is suddenly vented to atmospheric pressure. An outlet tube, suitably terminating in a spray nozzle, is provided leading from the ethylator into a body of water, said water being held suitably in the temperature range from about 0° to about 15° C., and preferably below about 12° C. The water in the receiving vessel may be maintained in a state of agitation so that no substantial local concentration of reaction products will be present at any time in the receiving vessel. This step insures uniform dispersion of the ethyl cellulose throughout the aqueous medium and complete extraction of sodium chloride. After the reaction product has been mixed with cold water, as just described, the aqueous suspension is heated to a temperature above the boiling points of the volatile materials, i. e., alkyl halide, alkyl ether, and alcohol, it is desired to recover. The vapors of such volatile materials are passed into a suitable condensing system. After having removed alkyl halide, ether and alcohol from the aqueous suspension of the cellulose ether, the latter is recovered from the water by filtration.

In the step of heating the aqueous slurry of ethyl cellulose to recover unreacted ethyl chloride therefrom, the temperature may or may not be elevated to a point such that ethyl ether and ethyl alcohol formed as by-products in the ethylation will be driven off from the water, depending upon the amount of such materials formed and the relative value of such products as compared with the cost of their recovery in the present process.

The following example serves to illustrate the practice of our invention:

To 600 g. of alkali cellulose, prepared by the interaction of 169 g. of 96% alpha-cellulose, 330 g. of NaOH and 101 g. of water, was added 1850 g. of ethyl chloride. The mixture was heated for 4 hours at 120° C. and a pressure of 240 pounds gage. The pressure was suddenly released and the products discharged into ice water. The cold aqueous slurry was heated, and ethyl chloride, ethyl ether and ethyl alcohol were driven off as vapor into a condensing system. The mixed condensate was thereafter fractionated to isolate the individual components thereof. 1360 g. of ethyl chloride, 49.5 g. ethyl ether and 71 g. ethyl alcohol were recovered. Approximately 270 g. of ethyl cellulose was recovered from the water by filtration, as a finely divided substantially pure product. The reactor was clean and free from ethyl cellulose.

The hereindescribed process can also be applied with equal effectiveness to the recovery and purification of methyl cellulose, methylethyl cellulose, propyl cellulose, or other lower alkyl ethers of cellulose produced by the reaction of alkali cellulose with such etherifying agents as methyl, ethyl, or propyl chlorides, bromides, or iodides, or mixtures thereof, at suitable temperatures and under their corresponding pressures.

Other modes of applying the principle of our invention may be employed instead of the one explained, change being made as regards the method herein disclosed, provided the step or steps stated by any of the following claims or the equivalent of such stated step or steps be employed.

We, therefore, particularly point out and distinctly claim as our invention:—

1. The process which consists in etherifying an alkali cellulose with an excess of a lower alkyl halide in a closed reactor, thereafter employing the pressure of the remaining volatile reactants to effect a complete discharge of the reactor content when pressure thereon is released, and leading the discharged reactants and product into a body of water, the temperature of which is substantially below the boiling point of the alkyl halide.

2. The process which consists in etherifying an alkali cellulose with an excess of a lower alkyl halide in a closed reactor, thereafter employing the pressure of the remaining volatile reactants to effect a complete discharge of the reactor content when pressure thereon is released, and leading the discharged reactants and product into a body of water, the temperature of which is substantially below 12° C. but above the freezing point thereof.

3. The process which consists in etherifying an alkali cellulose with an excess of a lower alkyl halide in a closed reactor, thereafter employing the pressure of the remaining volatile reactants to effect a complete discharge of the reactor content when pressure thereon is released, leading the discharged reactants and product into a body of water, the temperature of which is substantially below 12° C. but above the freezing point thereof, and recovering the so-precipitated, finely divided cellulose ether and the so-condensed alkyl halide.

4. The process which consists in etherifying an alkali cellulose with an excess of a lower alkyl halide in a closed reactor, thereafter employing the pressure of the remaining volatile reactants to effect a complete discharge of the reactor content when pressure thereon is released, conducting said reaction product under the surface of a body of cold water in such volume and at such a temperature that alkali halide in the product is completely dissolved and unchanged etherifying agent is condensed, and recovering the so-precipitated, finely divided cellulose ether.

5. The process which consists in etherifying an alkali cellulose with an excess of a lower alkyl halide in a closed reactor, thereafter employing the pressure of the remaining volatile reactants to effect a complete discharge of the reactor content when pressure thereon is released, conducting said reaction product under the surface of a body of cold water maintained in a state of agitation, said water being employed in such volume and at such a temperature that alkali halide in the product is completely dissolved and unchanged etherifying agent is condensed, and recovering the so-precipitated, finely divided cellulose ether.

6. The process which consists in etherifying an alkali cellulose with an excess of ethyl chloride in a closed reactor, thereafter employing the pressure of the remaining volatile reactants to effect a complete discharge of the reactor content when pressure thereon is released, leading the discharged reactants and product into a body of water at a temperature substantially below 12° C. but above the freezing point thereof.

7. The process which consists in etherifying an alkali cellulose with an excess of ethyl chloride in a closed reactor, thereafter employing the pressure of the remaining volatile reactants to effect a complete discharge of the reactor content when pressure thereon is released, leading the discharged reactants and product into a body of water at a temperature substantially below 12° C. but above the freezing point thereof, and recovering the so-precipitated, finely divided ethyl cellulose.

WALTER J. LE FEVRE.
JOSEPH W. BRITTON.